No. 730,628. PATENTED JUNE 9, 1903.
W. ESTY.
VEHICLE TIRE.
APPLICATION FILED JULY 13, 1901.
NO MODEL.

Witnesses
M. E. Torrence
A. M. Houghton

Inventor
William Esty.
by
Attorney

No. 730,628. Patented June 9, 1903.

UNITED STATES PATENT OFFICE.

WILLIAM ESTY, OF LACONIA, NEW HAMPSHIRE.

VEHICLE-TIRE.

SPECIFICATION forming part of Letters Patent No. 730,628, dated June 9, 1903.

Application filed July 13, 1901. Serial No. 68,211. (No model.)

*To all whom it may concern:*

Be it known that I, WILLIAM ESTY, a citizen of the United States, residing at Laconia, in the county of Belknap and State of New Hampshire, have invented certain new and useful Improvements in Vehicle-Tires, of which the following is a specification.

The vehicle-tire which constitutes the subject-matter of the present invention is intended more particularly for self-propelled vehicles, now commonly known as "automobiles." With such vehicles pneumatic tires have proved to be lacking in durability and solid rubber tires are expensive on account of the large amount of rubber required, and both are objectionable because they slip on wet pavements.

The present invention has for its object the production of a light, economical, durable, and non-slipping tire; and to this end the present improved tire is composed of a knit fabric, arranged in layers, united together preferably by being permeated with rubber, which is then vulcanized.

The present improved tire is illustrated in the accompanying drawings, in which—

Figure 1:
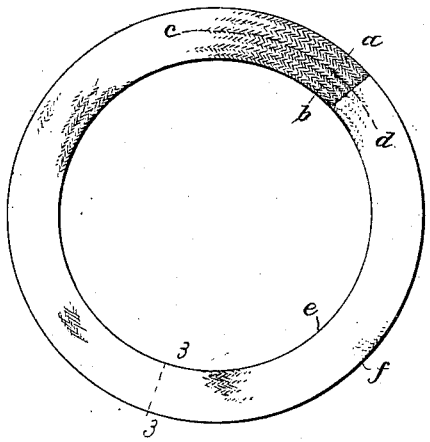
Figure 2:
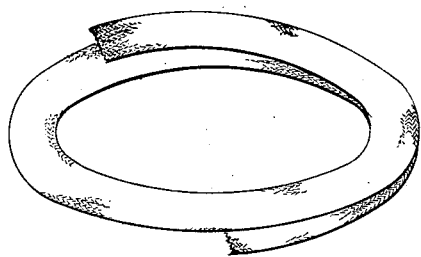
Figure 3:
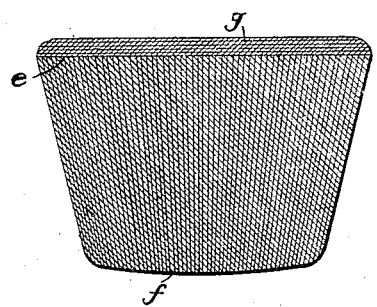
Figure 4:
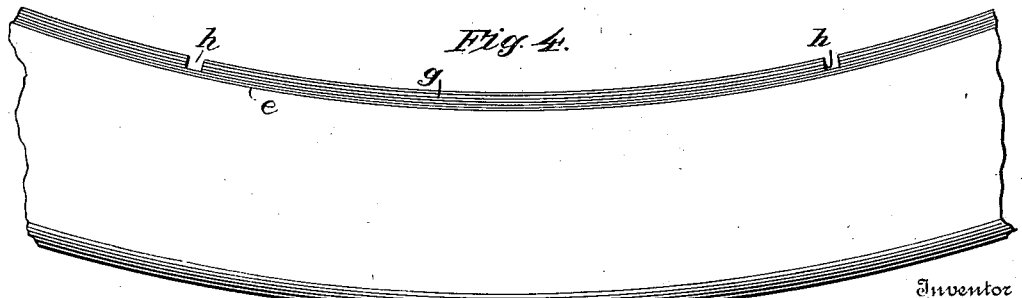

Figure 1 is a side view of a tire made in accordance with the present invention. Fig. 2 is a perspective view of the knit fabric which constitutes the foundation for the tire, illustrating its helicoidal shape. Fig. 3 is a cross-section, on a large scale, of the tire, the said section being in the plane indicated by the line 3 3 in Fig. 1. Fig. 4 is a side view of a portion of the tire on a large scale.

The foundation of the tire is made of knit fabric, which is preferably knit in a strip of indefinite length, and desirably the strip is sufficiently long to allow the entire fabric which enters into a single tire to be composed of a single piece. In fact, the strip may be knit of sufficient length so that a single integral strip may make more than one tire. In knitting this fabric the courses of the knitting extend crosswise of the fabric, as indicated, for example, by the line $a\ b$ in Figs. 1 and 4, while the "wales" extend lengthwise of the fabric, as indicated, for example, by the line $c\ d$ in Fig. 1. In knitting the fabric the stitches are knit with varying tightness along each course, so that the stitches are tightest at the selvage $e$, are progressively looser toward the selvage $f$, and are loosest at the selvage $f$. As the result of this relative degree of tightness in the stitches the fabric is looser and more elastic along the selvage $f$ than along the selvage $e$, and consequently the fabric assumes a curve in its length—that is, along the wales $c\ d$—and by proper regulation of the tightness of the stitches the curve which is thus assumed by the fabric can be made to conform exactly to the size of the wheel to which the tire is to be applied. The fabric thus knit is wound in a helicoidal form, so that the body of the tire is made up of overlying spiral layers of the helicoidal knit fabric. This helicoidal arrangement of the fabric is indicated in Fig. 2, in which the different layers of the helicoidal fabric are separated apart for the purposes of illustration. It takes about eighty layers of the fabric to make a tire having a tread three and a half inches wide. When the fabric is thus knit and wound in proper shape in overlying layers to form the foundation of a tire, said layers are united together. This union is preferably effected by incorporating soft rubber with the knit fabric, so that it permeates the interstices of the fabric, and the whole mass is then vulcanized together under pressure in suitable molds, thus firmly securing the whole into a single mass, so that the completed tire is composed of the layers of knit fabric and of rubber. One way of thus uniting the rubber and knit fabric is as follows: The clear rubber is first prepared of the required composition and is rolled out between hot rolls in thin sheets of the required thickness. For this purpose the thickness would be about one-sixteenth of an inch, depending on the thickness of the fabric to be vulcanized together. This rubber is then cut with dies or otherwise in segments of a circle of the diameter of the wheel. These segments might be one-fourth or one-half the circumference of the wheel or whatever length would be most convenient and of the width of the knit fabric. Then the rubber segments are coiled between the layers of the fabric as they are built up. Twenty-five or thirty layers of rubber and fabric are then coiled up around a form of the size of tire wanted, this number making a pile, say, three inches high. These are then clamped between plates to give it the right form and bolted down firmly during the vulcanizing process until they are compressed into a space not more than one-half or one-fourth their original bulk. The rubber in the vulcanizing process is forced each way into the layers of the fabric. Two or three of these rings just described are then placed in the mold which is the shape of the finished tire, with a new layer of rubber of the same thickness as before placed between them. The mold is then closed and bolted firmly together and screwed down as the vulcanizing process goes on until it is thoroughly heated through to the proper temperature, when the rubber flows between the meshes and permeates the fabric completely. The object in compressing these into thinner rings first, then afterward vulcanizing these rings together to make up the quantity for a single tire, is its bulk on the start, for a tire herein described takes about eighty layers of the fabric, which as it comes from the knitting-machine is nearly one-eighth of an inch thick and the rubber being about one-sixteenth of an inch thick too bulky a pile is produced, and hence the advantage of vulcanizing the thinner rings, then piling these together in the mold, and vulcanizing the rings together a second time. It takes a powerful pressure, such as is obtained by a hydraulic press, to force the rubber into the fabric and compress the whole into a solid mass.

Another process of making these tires is running the fabric as it comes from the knitting-machine with a thin sheet of rubber on one side, or both, through heated conical rolls, rolling the rubber and fabric together, reducing its bulk in the rolling process, then coiling these rubber-coated layers in the mold, and bolting it firmly together in the vulcanizing process, as before. The fabric when finished is pressed tight against itself. The quantity of rubber used is preferably just sufficient to permeate the fabric between the stitches and fibers and simply makes the cementing or uniting material. In fact, the fabric is completely saturated with the rubber.

The outer selvages $f$ constitute the tread of the wheel, and the inner selvages $e$ constitute the base of the tire, which seats against the felly of the wheel. Owing to the manner in which the knit fabric is knit, the tire is narrower at the tread than at the base, as shown in Fig. 3, this being due to the fact that on account of the greater tightness of the stitches at the inner selvages $e$ they occupy more space, and consequently make the fabric thicker at this point. This is desirable, since it gives the correct form to the tire when it comes from the molds in which the layers of the tire are united together.

It will be noted that the knit courses $a\,b$ extend substantially radially, so that the outer selvages $f$ constitute the tread of the tire, and this is important and desirable, because as the tire wears down the stitches cannot unravel.

In vulcanizing the layers of the tire together a comparatively small amount of rubber is used, so that the completed tire is made up mostly of the knit fabric.

An important advantage of the manner in which the fabric is knit (in addition to giving the right shape to the tire and bringing selvages at the tread) is that there is no waste of the fabric, since it is knit in just the right shape to go around the wheel.

A solid tire made in accordance with the present invention is nearly as resilient as a pneumatic tire of the same size. The improved tire is much cheaper and more durable than a pneumatic tire or than a solid rubber tire, since it contains much less rubber. It does not slip on wet pavements as easily as rubber, since it is composed mostly of the knit fabric. It is one-third lighter than clear rubber, and the fibers of the fabric do not tear apart, as would be the case with a woven fabric.

In applying the improved tire to the felly of a wheel I prefer to introduce between the tire and the felly at the base of the tire a few bands of woven fabric wound around the tire, as indicated at $g$ in Figs. 3 and 4, having grooves $h\,h$ across its inner face for clamping the tire onto the felly and to keep the same from creeping along the felly. These layers of woven fabric are likewise saturated with soft rubber and united with each other and with the knit layers by vulcanizing and preferably in one operation with the union of the knit layers, so that the woven base is securely united to the knit tire. Hence the body of the tire which furnishes the tread is composed of the knit layers, while the base is composed of the woven layers, the whole being incorporated with rubber and vulcanized together to constitute a single mass.

While I prefer to make the foundation of the tire of a single unbroken spiral strip of knit fabric, it might be made of segments of knit fabric cut from a knitted fabric not knit to shape; but this would not be as economical in mode of manufacture and the completed tire would not be as perfect; but however the foundation fabric be knit the tire made of it would still possess the elasticity which is characteristic of a knit fabric. It will further be noted that on account of knitting the stitches more loosely at the tread the greatest elasticity is at the tread, which is desirable and important.

I claim as my invention—

1. A tire composed of layers of knitted fabric united together, selvages of the layers constituting the tread of the wheel.

2. A tire composed of layers of knitted fabric united together, the stitches of the tread being looser than those at the base of the tire.

3. A tire composed of layers of knitted fabric united together, the stitches being progressively tighter from the tread to the base of the tire.

4. A tire composed of a helicoidal strip of knitted fabric wound in a spiral to constitute a plurality of layers, said layers being united together.

5. A helicoidal knitted fabric, the stitches along one selvage being knit more tightly than those along the other selvage.

6. A helicoidal knitted fabric each course of which is knit progressively tighter from one selvage to the other.

7. A tire composed of a helicoidal strip of knitted fabric wound in a spiral to constitute a plurality of layers, said layers being incorporated with rubber and vulcanized together, the stitches being progressively tighter from the tread to the base of the tire.

8. A tire consisting of a body composed of layers of knit fabric which furnish the tread, and of a base composed of layers of woven fabric, all of said layers being incorporated with rubber, and the whole being vulcanized to constitute a single mass.

9. A solid tire, having its body and tread composed of layers of knitted fabric vulcanized together.

In witness whereof I have hereunto signed my name in the presence of two subscribing witnesses.

WILLIAM ESTY.

Witnesses:
GEORGE W. SHERWELL,
LESTER A. DEARTH.